United States Patent [19]
Halasz et al.

[11] 3,866,308
[45] Feb. 18, 1975

[54] METHOD OF MAKING A COLUMN FOR CHROMATOGRAPHY

[75] Inventors: István Halász, Kobenhuttenweg 56, Saarbrucken; Jurgen Asshauer, Dudweiler; Richard Endele, Saarbrucken; Klaus De Haas, Ludwigshafen, all of Germany

[73] Assignee: said Halasz, by said Asshauer, Endele and De Haas

[22] Filed: Mar. 4, 1974

[21] Appl. No.: 447,930

[30] Foreign Application Priority Data
Mar. 30, 1973 Germany............................ 2315904

[52] U.S. Cl....................... 29/527.4, 29/420, 55/386, 210/198 C
[51] Int. Cl............................................. B23p 17/00
[58] Field of Search................ 29/420.5, 420, 527.4; 55/386; 210/198 C

[56] References Cited
UNITED STATES PATENTS

| | | | |
|---|---|---|---|
| 3,005,514 | 10/1961 | Cole et al. | 55/386 |
| 3,300,849 | 1/1967 | Wiseman | 29/420 X |
| 3,327,378 | 6/1967 | Halasz et al. | 29/420.5 |
| 3,514,925 | 6/1970 | Bossart | 55/386 |
| 3,735,570 | 5/1973 | Bergen et al. | 55/386 |

Primary Examiner—C. W. Lanham
Assistant Examiner—D. C. Reiley, III
Attorney, Agent, or Firm—Ralf H. Siegemund

[57] ABSTRACT

A drawn high grade steel tube is prepared for use in a separation column for a chromatograph in that the inner diameter of the tube is enlarged by removing material, either through boring or electrochemically. The newly formed surface may be plated with gold or another noble metal.

5 Claims, 2 Drawing Figures

METHOD OF MAKING A COLUMN FOR CHROMATOGRAPHY

BACKGROUND OF THE INVENTION

The present invention relates to a metal tube with particular inner surface and to be used as a separation column for chromatography.

Separation columns of the presently known variety are made from tubing with an inner diameter of up to several millimeters and filled with small particles of a separation and sorption material, such as silica gel; a column is deemed packed in that manner. The particles used have diameters (or a corresponding dimension) of 50 $\mu$ down to 1 $\mu$. Packing them is the more difficult the smaller the particles are. Particles having size in the 20 to 50 $\mu$ range can be packed dry or wet, but below 20 $\mu$ one will preferably flush the material into the tube in that the particles are suspended in a liquid.

Such chromatographic columns have to meet various requirements. The material should be corrosion proof and inert. These requirements, particularly posed for liquid chromatographs arise from the fact that acidic as well as basic buffer solutions have to be used. On the other hand spurious components may be present in the column material which act as catalysts for pharmaceutical products.

The reproducibility of results is another requirement, in other words, columns packed with similar separating material should have similar properties. Moreover, the recorded fractogram or chromatogram should consist of pronounced peaks without bandspreading, and other influences deteriorating the chromotograms should not arise.

The tubes for the chromatography columns are usually made of glass. However, glass is not useable in all cases, because, for example, a pressure in excess of 100 atmospheres cannot be applied to such a column. Liquid chromatography, however, requires occasionally an input pressure of up to 500 atmospheres, particularly in order to arrive at reasonably tolerable periods of time for analysis. A glass tube could be provided with a metal jacket to enable the column to withstand such high pressure, however, that method was found to be quite expensive and complicated. Hence, one has used metal tubing for the packed columns. Particularly, precision-drawn tubes made of tantalum or of corrosion-proof high grade steel have been used for that purpose. However, tantalum tubes are very expensive, so that using high grade steel seems to be the best solution.

Unfortunately, steel tubes when used for chromatographic columns are not as satisfactory as glass tubes as far as reproducibility of results is concerned, particularly when the active material consists of particles having sizes from 20 to 25 $\mu$, and having been packed into the tube wet or dry. For particles in the range from 3 to 8 $\mu$ rather large band spreading was observed, even doublets arose for uniform substances and the curves of the fractogram exhibited a tail. It was found that internal surface smoothness had little, if anything, to do with the problem. More about these aspects will be discussed below.

SUMMARY OF THE INVENTION

It is an object of the present invention to avoid the difficulties arising upon using metal tubes for chromatographic columns.

In accordance with the preferred embodiment of the invention, it is suggested to remove material from the inner wall of a drawn tube, preferably by cutting and machining or electrolytically. The surprising result of working the tube in that manner is to be seen in that in fact the problems outlined above and regarding high grade steel tubes are being avoided.

In the preferred form of practicing the invention, a drawn tube is bored. It is important that the drill has at least 5 % up to 10 % excess dimension, so that material is removed by the drilling and cutting process over the entire inner wall region of the tube. Drilling may proceed from opposite ends of the tube, particularly if the latter is a long one.

Salient properties of the tube before and after boring can be summarized as follows:

The tube does not have uniform cross-section but must be expected to vary by 5 %. The inner tube wall has longitudinal grooves, which are about 30 to 50 $\mu$ wide. The inner tube wall is established by a more or less continuous, porous oxide strata with 1 $\mu$ pores or thereabouts; additionally many individual pores with 20 to 50 $\mu$ diameter are located in surface near regions inside of the tube. The pores were a byproduct of the drawing process and were found particularly in the oxide layer in the tube.

After boring, e.g. after enlarging the inner diameter of the tube through a material removing process, it was observed that the inner surface layer was free from any porous surface layer; there were no longer any longitudinal grooves, but the inner surface was by no means smooth; cuts and gratings of up to 50 $\mu$ width extended transversely to the direction of boring; moreover, continuous helical grooves had been carved into the inner surface of the tube, undoubtedly resulting from the rotation plus axial progression of the boring tool. The cross-section of the tube was constant throughout (i.e., any variations were considerably lower than 5 %).

It is not quite established, which particular feature is predominantly responsible for the improved properties of the tube as far as using it for a chromatographic column is concerned. It is believed, however, that the removal of the oxidized surface layer as such, which originally remained from the drawing process, is primarily or at least to a significant degree responsible for the improvement in the properties of the chromatographic tube. However, the smoothness of the inner wall surface is not or only to a very insignificant degree responsible because boring resulted in a wall surface texture which was not smooth, but probably even rougher than before. Machining, i.e., mechanical drilling is not an essential mode of operation; for practicing the invention, the material of the wall zone can be removed by electrolytical machining instead. A further improvement, however, is obtained, if subsequently the inner tube surface is layered with a noble metal, such as gold, using a suitable process, such as vapor depositing or electrolysis.

DESCRIPTION OF THE DRAWING

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
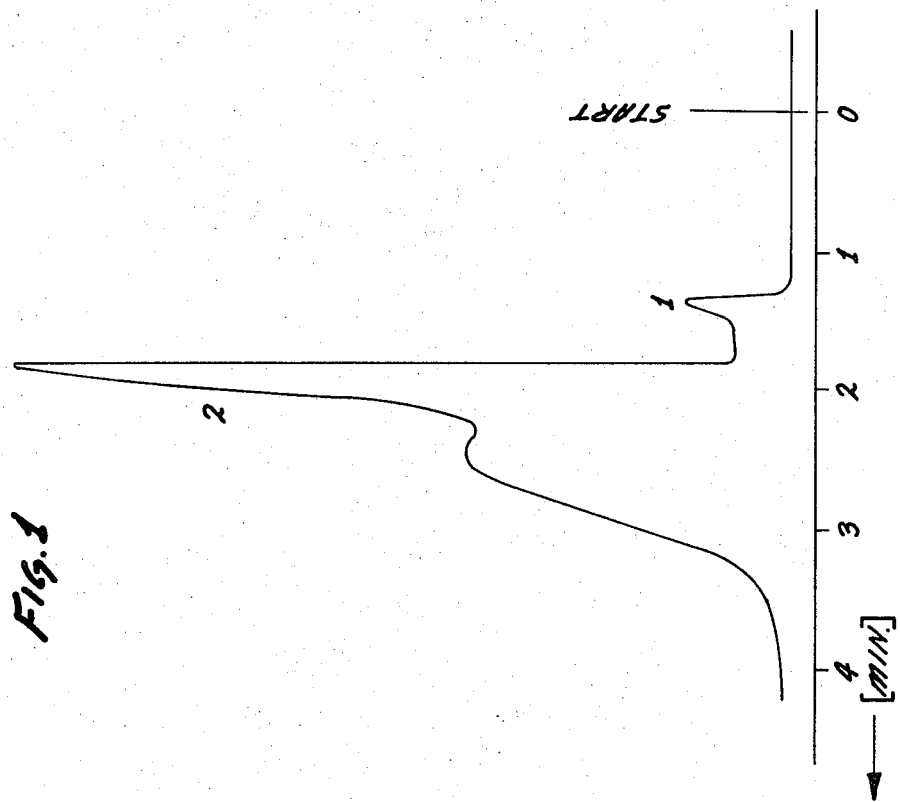
FIG. 1 is a chromatogram plotted for purposes of demonstrating the problem solved.

Proceeding now to the detailed description of the drawing, the plot of FIG. 1 is included here to demonstrate more fully the problems encountered in drawn high grade steel tubes when used for a chromatographic column. Specifically, a corrosion-proof high grade tube was drawn with an outer diameter of 4 mm and an inner diameter of 2 mm; the tube was 30 cm long (about 1foot). The tube was packed with silicagel at a mesh size and fraction grade of 3 to 8 $\mu$. The particular substance is traded under the designation SI 100 by the Merck Company, Darmstadt, Fed. Rep. of Germany. The eluent was n-heptane at a temperature of 20° C. The samples used were benzol, peak 1, and biphenyl, peak 2.

The FIG. 1 now shows a chromatogram obtained with that equipment, and one can readily see the band spreading and formation of doubletts and of a tail formation in the curve. When using glass tubes, neither phenomena will be observed. Workers in this field have explained the differences in measuring results when using glass and high grade steel tubes in that a drawn steel tube has a less smooth inner surface than glass. Also, the variations in diameter along the tube's axis and encountered in steel tubes only were held responsible for the poorer performance of such tubes. A constant diameter is deemed particularly necessary for obtaining an uniform flow profile of the eluent along the axis and over the cross-section of the tube. But even when these rules were observed by careful selection of the tubes, one still found the discrepancy in result as between glass and steel tubes, (see e.g. J. J. Kirkland, J. Chromatog. Sci. 7, 361 (1969); B. L. Karger, K. Conroe, H. Engelhardt, J. Chromatog. Sci. 8, 242 (1970); B. Versino, H. Schlitt, Chromatographie 5, 332 (1972)).

It is, therefore, surprising that the mere removal of the inner surface layer, even without fine finishing the then resulting surface was found to change the situation drastically.

Again, a drawn high grade steel tube was used with a outer diameter of 6 mm., a length of 27 cm. and, initially, an inner diameter of 4 mm. The tube as then bored to increase the inner diameter to 4.2 mm. An inner packing of silica gel with a mesh grading of 5 to 9 $\mu$ (using also the material SI 100 furnished by Merck) was mixed with tetrabromoethane-methanal (density) of 2.0) to obtain a suspension. Mixing was effected ultrasonically. The lower end of the tube was closed by a paper filter, held in place by a wire mesh, and the silica-gel suspension is superimposed upon n-heptane and pressed into the tube from above under 300 atmospheres of pressure. The column was rinsed with n-heptane thereafter.

Figure 2:
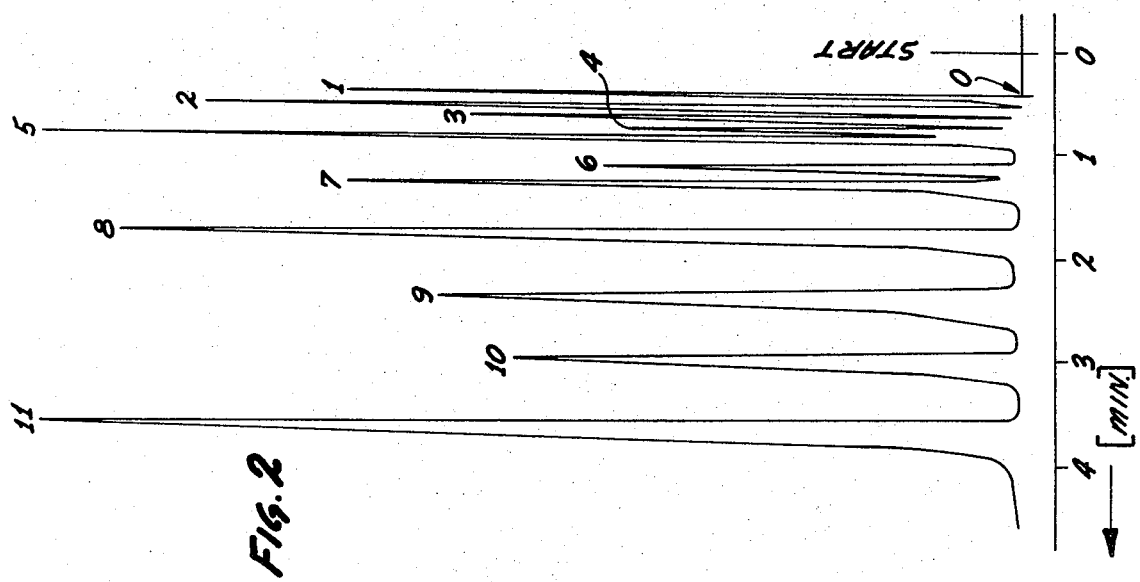
FIG. 2 is a chromatogram with an improved chromatographic column as per the preferred embodiment of the invention.

The column as prepared in the afore-mentioned manner was then installed in a liquid chromatograph and was then flushed with the eluent for two hours. FIG. 2 shows the resulting chromatogram. The various samples as represented by the separate and numbered peaks are as follows: 0—n-nonane, 1—tetrachlorethylene, 2—benzol, 3—naphthalene, 4—biphenyl, 5—anthracene, 6—o-terphenyl, 7—benzo (e) pyrene, 8—dibenzo (a,h) anthracene, 9—rubicene, 10—nitrobenzene, 11—p-nitrotoluol This result is practically identical with a result obtained with a glass tube. One can obtain 100 theoretical plateaus or levels per meter or more for a linear speed of the eluent of 1 to 2 cm per second. The speed of analysis is more than 100 theoretical levels or plateaus per second.

In a modified example, the same conditions were set up as before except that the suspension medium was thin liquidous paraffin oil, also of Merck with a density of 0.8 g/ml and a viscosity of 0.2 poise.

Another example was practiced in the following manner. A corrosion-proof, high grade steel tube with inner diameter of 2 mm. and being 50 cm long was bored to enlarge the inner diameter to 2.3 mm. A 1 foot long boring tool was sued and boring proceeded from both ends. The outer diameter of the tube was 4 mm. The bored inner surface of the tube was then cleaned and electrochemically gold-plated, but other plating methods could be used. The column proper was then established by using silica-gel SI 100 of Merck with particle sizes from 25 to 32 $\mu$. This material was dry-packed in a conventional way and as is known in the art of glas chromatography. After flushing the column with eluent for 4 hours, the column was ready for use in a chromatograph.

Still another example can be described as follows. A drawn high grade steel tube is filled with a mixture of metaphosphoric acid and glycerin with 10 to 40 % acid, preferably 20 %. The choice here depends to some extent on the particular steel used. This solution was continuously passed through the drawn tube. A wire is placed and held in the center of the tube to serve as an electrode. A negative voltage was applied to the wire, so that the wire serves as a cathode, while the tube was electrically positive to serve as anode. A current was passed through accordingly to effect electrolytical removal of tube material. The current was chosen to have a density of 0.2 Amperes per $cm^2$. Individual adjustment may be needed here to trim the operation to the particular conditions.

As a consequence, material was removed from the inner tube wall for as long as the flow of electric current was maintained. The removal can be quite accurately metered through time-current control.

After sufficient material had been removed (about 0.1 mm. or thereabouts), the tube was rinsed in acetone and packed in a manner outlined above. A gold plating step may also be used here.

In all these cases and when using a chromatograph column made in accordance with any of the examples above, one obtains excellent reproducibility of results, not only for grain sizes of 20 to 50 $\mu$, but also for particles of sizes below 20 $\mu$ and under unusually good efficiency.

The invention is not limited to the embodiments described above, but all changes and modifications thereof not constituting departures from the spirit and scope of the invention are intended to be included.

We claim:

1. In a method of making a chromatographic separation column which includes using a drawn metal tube and packing it with granular or powdered material for chromatographic operation, the improvement comprising the step of removing a surface layer from the inner wall of the tube prior to packing.

2. In a method as in claim 1, and including the step of depositing a layer of a noble metal onto the surface of the tube as resulting from the removal step.

3. In a method as in claim 2, wherein the noble metal is gold.

4. In a method as in claim 1, wherein the removal step is carried out electrolytically.

5. In a method as in claim 1, wherein the drawn tube is bored to increase its inner diameter for removing said surface layer.

* * * * *